Figure 1:
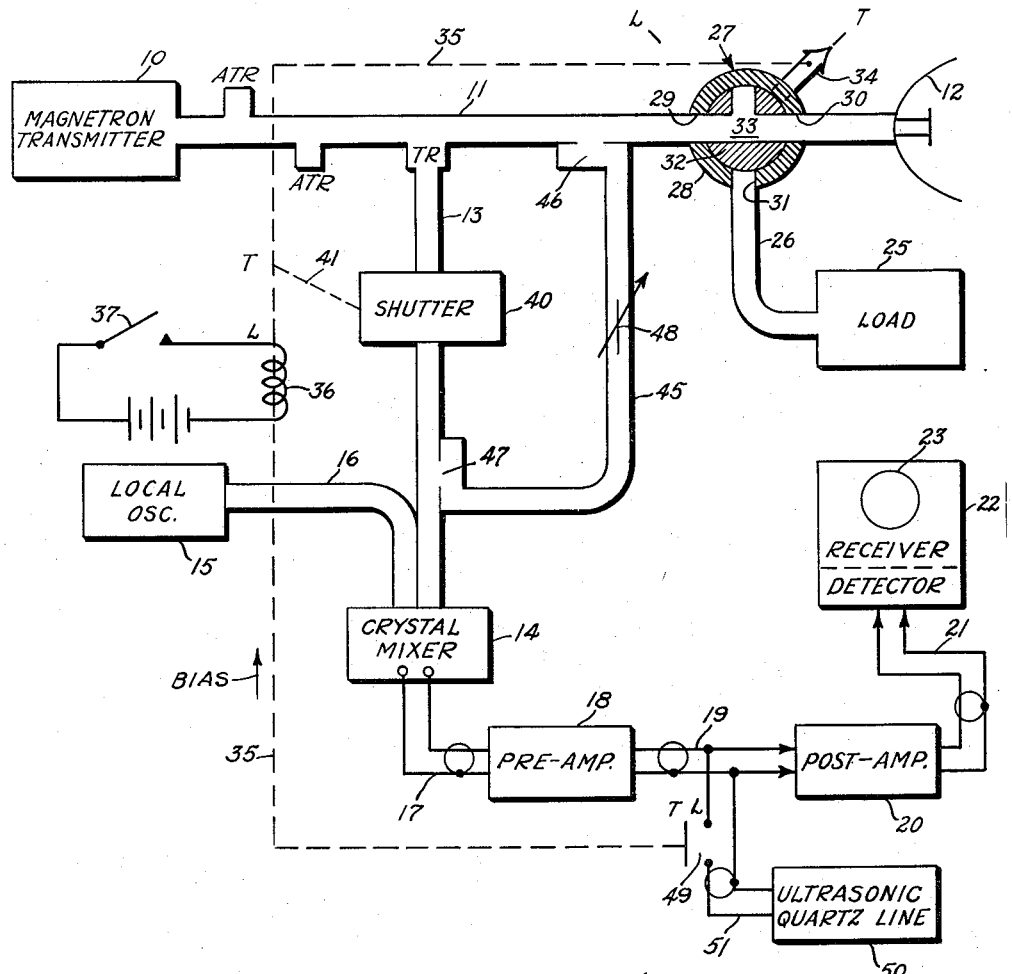

March 6, 1962  T. W. HOLLIS, JR  3,024,461
RADAR TESTING DEVICE
Filed May 22, 1959

INVENTOR.
THOMAS W. HOLLIS, JR.
BY
H. H. Locke
ATTORNEYS

United States Patent Office 3,024,461
Patented Mar. 6, 1962

3,024,461
RADAR TESTING DEVICE
Thomas W. Hollis, Jr., Towson, Md., assignor, by mesne assignments, to the United States of America as represented by the Secretary of the Navy
Filed May 22, 1959, Ser. No. 815,239
7 Claims. (Cl. 343—17.7)

This invention relates to the testing of the reliability of radar ranging equipment and more particularly to testing equipment which is built-in or incorporated within the radar ranging equipment whereby testing operations may be conducted at any time during operating and nonradiating conditions of the radar ranging equipment.

It has long been the practice in testing radar ranging equipment to focus or concentrate radar signal energy toward an object of known distance or a radar echo box to produce echo signals in the radar receiver having an A-scope or a plan position indicator (PPI) scope or other calibrated indicating means for checking the range indications with the known range of a test target object or of the echo box. Where radar ranging equipment is used in aircraft devices it becomes apparent that testing of the radar can only be accomplished when the aircraft is grounded and in a maintenance area where external test equipment may be attached to the radar and the aircraft radar ranging antenna system directed toward an echo box or a target object of known distance. Where radar ranging equipment has built-in test components, such components are usually of a nature to check the ratio of the transmitted power to the minimum receivable signal power for calibration of the radar ranging system; that is, by testing various voltages, adjustments may be made which are necessary to accomplish the accuracy and efficiency needed in the radar ranging device. Other built-in radar ranging test equipment utilizes a switchable length of waveguide, such as a built-in echo box, to produce false echo range signals for the receiver. Equipment of the latter type is usually used for ground radar since additional waveguide structures sufficient to produce false echo signals require considerable space and involve additional weight to accommodate the additional waveguide structures. In the prior known devices using considerable additional equipment to produce false echo signals and for checking voltage quantities at various points in a radar system have the disadvantage of making radar ranging equipment too big and heavy for airborne equipment.

In the present invention a radar ranging device may be used with few additions thereto to obtain sample calibrated radio frequency (RF) signals to be utilized in the same crystal mixer circuit used by the radar receiver in order to produce delayed and attenuated intermediate frequency (IF) simulating radar echo targets. The delayed and attenuated IF signals are generated in an ultrasonic quartz line which line provides a predetermined or preselected delay in the sampled radar pulses to produce the simulated target object echo signals. The radar ranging system is switchable to a dummy load and the receiver channel is shutter controlled so that during the test operation radar signals are not transmitted whereupon all ground clutter or other noises are eliminated in the test operation of the radar ranging system. The ultrasonic quartz delay line is switchable into the IF receiver channel during test operation to produce simulated target object signals. The dummy load switch, the ultrasonic quartz line switch, and the shutter means may be operated any time, in unison or separately, to perform radar testing during actual radar ranging transmission and in airborne flight. The additional components necessary for a radar ranging system require little space and are of little additional weight whereby these radar testing components may be incorporated in the radar ranging system for airborne equipment with little sacrifice of space and weight in the aircraft. The advantage of making periodic tests of the ardar ranging efficiency and operation far exceeds the disadvantages of the additional space and weight requirements. It is, therefore, a general object of this invention to provide a radar ranging system incorporating radar ranging test components sampling radar ranging pulse energy for producing corresponding simulated echo radar signals of known delay which may be used to calibrate the efficiency and operation of the radar ranging system.

Figure 2:
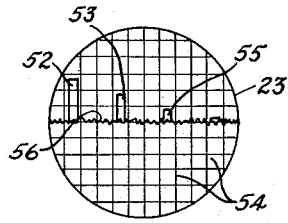

These and other objects, advantages, features, and uses may become more apparent to those skilled in the art when considered along with the accompanying drawing, in which:

FIGURE 1 illustrates a block circuit diagram of radar ranging equipment incorporating the components in combination therewith for testing radar efficiency, and FIGURE 2 illustrates a type A radar scope showing received radar video range signals.

Referring more particularly to FIGURE 1, a radar transmitting device such as a magnatron 10 is shown coupled through a waveguide 11 connected to an antenna means 12. The waveguide 11 connecting the transmitter and antenna has the usual receiver waveguide channel 13 coupled thereto through the usual and well-known transmit-receive (T–R) tube switching means identified in the drawing by the letters TR. Also, in the waveguide 11 between the transmitter 10 and the receiver channel 13 are one or more antitransmit-receive switching means, identified by the reference characters ATR, constructed and used in the well-known conventional manner of radar ranging equipment to prevent feedback of received echo signals to the transmitter. The receiver channel 13 is coupled to a crystal mixer 14 to cause the received echo energy conducted therethrough to be mixed with the oscillations from a local oscillator 15 coupled to the mixer 14 through a waveguide channel 16. Mixing of the frequency from the local oscillator and the received radar echo signals produces intermediate frequency which is transmitted over a coaxial cable 17 through a preamplifier 18. The output of the preamplifier 18 is through a coaxial cable 19, a post amplifier 20, and coaxial cable means 21 to a radar receiver 22. The radar receiver includes a detector circuit and other elements of receiving equipment of well-known design to present the received radar signals in video signal form on a cathode ray tube or scope screen 23 which may be of the A-scope type, a PPI presentation, or other type indicator means, as desired. As is well understood of radar equipment of this type, the transmitter magnatron 10 is triggered to produce periodic pulses of high energy which radiate from the antenna 12 into space. The radiant energy striking objects in the beam path of the pulse energy radiated from antenna 12 will be reflected back to the antenna 12 and conducted through the waveguide 11 to the receiver channel 13. During transmission, the ATR switches pass the transmitted pulses to the antenna while the TR switch blocks the greater part of the transmitted energy from the receiver channel 13. The spike leakage of transmitted energy is greatly attenuated in the TR switch whereby each transmitted pulse will be presented in the receiver for an initial pulse from which measurements are made. For echo signals received, the ATR switches prevent the echo signal energy from entering the transmitter and the TR switch is controlled to conduct the received echo signal energy through the receiver channel 13 to be mixed with the oscillations of the local oscillator in the mixer 14. The intermediate frequency produced thereby is conducted by coaxial cable through the preamplifier and the post amplifier to the receiver 22 where the echo pulses are detected and presented on the indicator means 23.

The time lapse between each indicated transmitted initial pulse and corresponding echo pulse calibrated in distance will indicate the range of the target object reflecting radar energy back to antenna 12. The above described radar ranging system is basic and considered to be well understood by those skilled in the art.

In order to incorporate equipment to test the radar range measurement efficiency of the radar ranging system, a dummy load 25 is coupled through a waveguide 26 to a waveguide selector switch generally illustrated herein by the reference character 27. For the purpose of illustration, the waveguide selector switch 27 is shown as having a body portion 28 with aligned passages 29 and 30 therein, these passages being coupled in the waveguide 11 from the transmitter 10 to the antenna 12. A third passage 31 in body portion 28 couples the waveguide 26 for the dummy load 25. Within the body portion 28 of the waveguide selector switch 27 is illustrated a rotatable switch member 32 having a T-passage 33 therein. The rotatable switch member 32 is controlled as illustrated herein by a lever 34. The waveguide selector switch 27 is shown in FIGURE 1 as being in the transmit position in which the waveguide 11 is open to the antenna 12 through the body passages 29 and 30 and the T-passage 33. When the lever 34 is actuated counter-clockwise to the position L, the T-passage 33 in the rotatable switch member 32 will connect the waveguide 11 with the dummy load waveguide 26. The waveguide selector switch 27 may be actuated in any desired manner but is shown herein as being actuated through mechanical means 35 by an electrical power actuator 36 under the control of an electrical switch 37 receiving voltage from a battery or other supply source. Let it be assumed for the purpose of illustration that when switch 37 is open as shown in FIGURE 1, the electrical power actuator 36 is not energized and the waveguide selector switch 27 is in a position to transmit energy from the magnetron 10 to the antenna 12 or in the T position shown in this figure.

In the receiver waveguide channel 13 is a waveguide shutter 40, of any well-known type, for switchable blocking and opening of the waveguide receiver channel 13. The shutter 40 may be actuated through mechanical or other means 41 under the control of the electrical power means 36. The waveguide shutter 40 will be in open position when the switch 37 is open and the waveguide selector switch 27 is in its T position, and shutter 40 will be closed when switch 37 is closed and the waveguide selector switch 27 is in the L position. The flat leakage of the magnetron energy through the TR switch means to the receiver waveguide channel 13 is greatly attenuated by the waveguide shutter 40. The attenuation by the waveguide shutter 40 is such that the flat leakage is at least 20 decibels (db) less than the magnetron energy sample to the mixer crystals. This affords sufficient isolation such that the normal variations in the flat leakage (change with life and temperature) will not affect the resultant IF signal from the mixer crystals.

A bypass waveguide 45 couples to the waveguide 11 between the TR switch means and the waveguide selector switch 27 by a coupler 46. The other end of bypass waveguide 45 connects the receiver waveguide channel 13 between the waveguide shutter 40 and the crystal mixer 14 by a waveguide coupler 47. At some point in the bypass waveguide 45 is an adjustable attenuator means 48 for adjustably attenuating sample radar energy received through the coupler 46. When the waveguide selector switch 27 is in the T position as shown, whereupon the waveguide shutter 40 is open, any sample of radar energy coming by way of coupler 46 through the bypass waveguide 45 is dissipated back into the waveguide 11 through coupler 47 and the open waveguide shutter 40.

An ultrasonic quartz line 50 is coupled through a coaxial cable 51 to the coaxial cable 19 coupling the preamplifier 18 to the post amplifier 20. This cable 51 has a normally open switch 49 therein which is actuated by the electric actuator 36 through the means 35. The reference characters T and L designate the transmit and load (test) position of switch 49 corresponding to the same designations for the waveguide selector switch 27 and waveguide shutter 40. The ultrasonic quartz line utilizes crystals of preselected characteristics to receive IF signals which are transmitted through the quartz line and reflected back producing delay and attenuation of the applied IF signals. The IF signals on the output of the preamplifier 18 are thus applied to the receiver and to the ultrasonic quartz line 50 which generates delay and attenuated signals of the same frequency which are applied through the post amplifier 20 and the coaxial cable 21 to the receiver 22 to indicate on the indicator means 23 of the receiver the range of a simulated target object. The radar receiver indicating means 23, as hereinbefore stated, may be of A-scope type shown in the enlarged view in FIGURE 2. In FIGURE 2 one transmitted pulse of the transmitted radar pulses is shown on the A-scope as a pulse 52 with an echo pulse 53 following thereafter in point of time for the purpose of example. The horizontal diameter coordinate of the A-scope shown in FIGURE 2 represents time while the vertical lines represent the amplitude or strength of the echo signals. The A-scope face illustrated in FIGURE 2 may be lined by grid lines or other means calibrated to indicate range in feet, yards, or miles along the horizontal coordinate while the target size is calibrated by the vertical coordinates of the scope face. The target echo signal 53 will be repeated in damped range sequence as shown by 55 until it is lost in the "grass" 56 caused by noise or other means entering into the system.

In the operation of the radar range device utilizing the built-in testing components, let it be assumed that the transmitter is transmitting pulses at periodic intervals by the magnetron 10 which pulses are conducted over waveguide 11 through the waveguide selector switch 27 to the antenna 12 where they are radiated into space. Any echo signals reflected back will be received by the antenna 12 and these echo pulses conducted back through the waveguide 11 and through the TR switch to the receiver channel 13. The waveguide shutter 40 being open under the condition of transmission, the echo signals will be conducted to the crystal mixer 14 where they are mixed with the oscillations from the local oscillator 15 producing an intermediate frequency conducted over the coaxial cable through the preamplifier 18 and the post amplifier 20 to the receiver 22. The echo signals will appear on the indicating means 23 whether this indicating means is an A-scope, a PPI scope, or other radar indicator for calibrating range. As more clearly seen in FIGURE 2, the distance of the radar echo signal indicated pulse from the transmitted pulse will provide a direct reading of the range of the target object from the radar equipment whether this radar equipment be air borne or in a fixed station. Any changes in range between the radar ranging system and a target object will be readily indicated on the range indicator of the radar ranging receiver. Any sample of radar energy passing through the bypass waveguide 45 from the coupler 46 to the coupler 47 will be dissipated back into the radar system through the open waveguide shutter 40 and receiver waveguide channel 13 thereby producing no modification of the received echo signals. The received echo signals will not be applied to the ultrasonic quartz line 50 since switch 49 is open under conditions of radar ranging operations. At any time that it is desired to test the efficiency and operation of the radar ranging system the switch 37 will be closed to close the waveguide shutter 40, to close switch 49, and to switch the waveguide selector switch 27 to the L position in which the transmitter magnetron 10 is coupled to the dummy load 25. The magnetron pulses will be sampled at the coupler 46 and these sampled pulse voltages will be conducted through the bypass waveguide 45 through the coupler 47 into the receiver waveguide channel 13 where they will be reflected back from the waveguide shutter 40 into the crystal mixer 14 producing IF signals. These IF signals will be conducted through the preamplifier 18 and over the coaxial cables 19 and 51 through switch 49 to the ultrasonic quartz line 50 where the simulated echo signals are generated by reflections in the ultrasonic quartz line through the post amplifier 20 to the radar receiver 22. The spike leakage of the transmitted pulse conducted through the TR switch and through the mixer 14 and amplifiers 18 and 20 to the receiver will be indicated on the visual indicating means 23 by the pulse 52 as shown in FIGURE 2. The simulated target object test pulses will be indicated by the primary echo and decay echo pulses 53 and 55 on this indicator since the ultrasonic quartz line 50 will delay the transmitted pulse to produce the echo pulse 53 at a point calibrated on screen grid lines 54. If the primary echo and decay echo pulses 53 and 55 do not occur at the proper range points for a preselected delay line 50, the radar ranging system will have drifted showing that it is not giving range indications accurately. Various adjustments may be made in the radar ranging system as necessary to bring the simulated echo signals 53 and 55 into correspondence with range indications corresponding to the preselected time delay built into the ultrasonic quartz line 50. After the radar ranging system is recalibrated to provide accurate range measurements, the switch 37 may be opened to again let the radar ranging system make actual range measurements of target objects in space.

During the testing operation the amplitude of the "train of pulses" sampled can be varied by attenuator 48 without affecting the decay rate or delay built into the ultrasonic quartz line 50. By incorporating the radar range testing means, the radar ranging system can be recalibrated at any time during the normal operation of the system. Using this system, it is possible to detect receiving system noise signals and gain changes within ±1 db (the decay rate of the line for this application being about 1 db per pulse). This may be accomplished by adjusting the amplitude of the delayed pulse train (using attenuator 48 and keeping below saturation of the mixer crystal) for a specified number of visible markers on the radar indicator 23 and noting any deviation from this condition. Further, during the testing operation of the radar system when the transmitter is connected to the dummy load, ground clutter and other reflecting objects producing the "grass" are normally eliminated providing a more accurate check of the radar equipment. This system of testing also allows the same crystal mixer to be used for the sample radar energy as is used for the echo signals of actual target objects. Actual radar operating conditions are simulated by means of this invention eliminating the need for high powered radiation and real targets. The electrical power means 36 for actuating the waveguide shutter 40, the switch 49, and the wave guide selector switch 27 requires only low voltage power such as 28 volts normally used in aircraft.

While many modifications and changes may be made in the constructional details and features of this invention, as by connecting the coupler 46 to the dummy waveguide 26 or other changes providing similar results and functions, applicant desires o be limited only by the scope of the appended claims.

I claim:

1. A built-in system of testing radar ranging equipment under operating and nonradiating conditions which includes a radar transmitter coupled through a waveguide channel to an antenna and a radar receiver coupled to said transmitter waveguide channel by a waveguide through a transmit-receive waveguide switch and a mixer, the coupling from the mixer to the receiver being through a coaxial cable, the invention comprising: a dummy load; a waveguide coupling said dummy load to said transmitter waveguide channel; a waveguide switch in said transmitter waveguide channel and said load waveguide coupling to alternately selectively switch radar signals to said antenna and to said dummy load; a switchable shorting means in said receiver channel between said transmit-receive switch and said mixer; a bypass waveguide channel coupling said transmitter waveguide channel to said receiver waveguide channel bypassing said transmit-receive switch and said switchable shorting means for sampling the transmitted radar signals, said bypass including an attenuator; and an ultrasonic quartz line switchably coupled to said receiver channel between said mixer and said receiver switchable for providing delayed decaying simulated radar signals for said receiver when said waveguide switch couples said transmitter to said dummy load and said switchable shorting means is in the shorting switched position whereby said simulated radar signals simulate a target in range in accordance with the delay constant of said ultrasonic quartz line and in intensity established by said attenuator.

2. A built-in system of testing radar ranging as set forth in claim 1 wherein said switchable shorting means is a waveguide shutter and said mixer mixes oscillations from a local oscillator with said radar signals applied through said receiver channel to provide intermediate frequency applied to said ultrasonic quartz line.

3. A built-in radar range testing means providing calibrated radio frequency under operating and nonradiating conditions of a radar ranging system including a radar transmitter coupled through a waveguide to an antenna for transmitting radar signals and a receiver coupled through a waveguide channel from said transmitter-to-antenna channel to a mixer and through a coaxial line from the mixer to the receiver, the receiver waveguide channel having a transmit-receive switch therein, the invention which comprises: a dummy load; a waveguide coupling said dummy load to said transmitter-to-antenna waveguide; a selector waveguide switch in said last-mentioned coupling for alternately selecting the waveguide communication of radar signals from said transmitter to said antenna and to said dummy load; a switchable waveguide shutoff in said receiver waveguide channel between said transmit-receive switch and said mixer; a bypass waveguide coupling at one end to said transmitter-to-antenna waveguide channel between said selector switch and said transmit-receive switch and at the other end to said receiver waveguide channel between said switchable waveguide shutoff and said mixer, said bypass waveguide coupling including an attenuator; a local oscillator coupled to said mixer to provide oscillations mixed with said radar signals; and an ultrasonic quartz line switchably coupled to said coaxial line between said mixer and said receiver to provide, in one switched condition, delayed decaying pulses for said receiver in accordance with the energy level of transmitted radar signals of a signal strength established by said attenuator, said selector waveguide switch, said switchable waveguide shutoff, and said quartz line switch being switchable in unison, whereby simulated target objects are simulated in the receiver in range and intensity in one switched condition.

4. A built-in radar range testing means as set forth in claim 3 wherein said switchable waveguide shutoff is a low power waveguide shutter and said dummy load is for high radar signal power.

5. A built-in radar range testing means as set forth in claim 4 wherein said receiver includes calibrated indicating means for indicating actual and simulated target object range measurements.

6. A built-in radar range testing means providing calibrated radio frequency under operating and nonradiating conditions of a radar ranging system comprising: a radar transmitter having a magnetron for producing high power radar periodic pulses and an antenna coupled by a waveguide conductor for transmitting said radar pulses as radiant energy; a high power dummy load coupled through a dummy load waveguide conductor to said transmitter-to-antenna waveguide conductor; a waveguide selector switch at the coupling juncture of said dummy load and transmitter-to-antenna waveguide conductors for selectively providing waveguide communication between said magnetron and antenna, and said magnetron and dummy load; a receiver waveguide conductor coupled to said transmitter-to-antenna waveguide conductor between said magnetron and said selector switch, said receiver waveguide conductor having a transmit-receive switch therein for blocking radar pulses transmitted from said magnetron and for passing echo radar pulses radiated back from a target object through said antenna; a mixer coupled to said receiver waveguide and to a local oscillator for producing an intermediate frequency from the radar and oscillator pulses on an output thereof; a low voltage actuated shutter in said receiver waveguide between said transmit-receive switch and said mixer; a bypass waveguide conductor bypassing said shutter and said transmit-receive switch with one end coupling said magnetron-to-antenna waveguide conductor between said receiver waveguide conductor and said selector switch and the other end coupling said receiver waveguide conductor between said shutter and said mixer for sampling the energy of said transmitted magnetron pulses, said bypass waveguide conductor having an attenuator therein; a receiver coupled by a coaxial cable conductor to the output of said mixer through a preamplifier and a post amplifier for receiving echo radar pulses of target objects and simulated target object pulses for receiver presentation; and an ultrasonic quartz line switchably coupled to said receiver coaxial cable between said preamplifier and said post amplifier to provide, when switched to said coaxial cable, a delayed and decaying pulse for each transmitted pulse from said magnetron whereby simulated echo signals representing a simulated target of known range are produced for test calibration of the radar ranging system.

7. A built-in system of testing radar ranging equipment including a transmitting and receiving radar ranging system having a transmit-receive switching means therein for controlling transmitted and received radar signals, the invention which comprises: a dummy load; waveguide means coupling said dummy load to the transmitting radar ranging system through a waveguide switch for selectively switching transmitted radar signal energy alternately to an antenna and to said dummy load; a switchable low power waveguide shutter in the receiving radar range system; a waveguide bypass connected by waveguide couplers to said transmitting system between said waveguide switch and said transmit-receive switching means and to said receiving system between said waveguide shutter and the receiver of said receiver system for sampling the transmitted radar energy signals, said bypass waveguide having an attenuator therein; a mixer in said radar receiving system between said waveguide shutter and said receiver for mixing oscillations from a local oscillator with the radar signals to produce an intermediate frequency for application to said receiver; and an ultrasonic quartz line coupled between said mixer and said receiver for receiving said sampled radar signals and reflecting these radar signals back to said receiving system delayed in time and decayed in strength established by said attenuator whereby simulated radar range signals are received in the receiver simulating a target object in range and intensity.

References Cited in the file of this patent
UNITED STATES PATENTS 2,549,131    Rideout      Apr. 17, 1951
2,788,520    Arenberg et al.      Apr. 9, 1957